(12) United States Patent
Wu

(10) Patent No.: US 6,371,686 B1
(45) Date of Patent: Apr. 16, 2002

(54) CENTRAL SHAFT FOR COLLAPSIBLE UMBRELLA

(76) Inventor: Tsun-Zong Wu, 8F, No. 76, Ln.103, Sec. 2, Nei-Hu Rd., Taipei (TW)

( * ) Notice: Subject to any disclaimer, the term of this patent is extended or adjusted under 35 U.S.C. 154(b) by 0 days.

(21) Appl. No.: 09/604,776

(22) Filed: Jun. 28, 2000

(51) Int. Cl.⁷ .............................. F16B 7/10; A45B 19/00
(52) U.S. Cl. ................... 403/377; 403/109.3; 135/25.1
(58) Field of Search .................................. 403/375, 377, 403/378, 380, 383, 109.1, 109.2, 109.3; 135/25.1, 25.4, 25.41, 15.1

(56) References Cited

U.S. PATENT DOCUMENTS

| | | | | |
|---|---|---|---|---|
| 5,287,869 A | * | 2/1994 | Wu | 135/25.1 |
| 5,702,198 A | * | 12/1997 | Kuo | 403/377 |
| 5,720,311 A | * | 2/1998 | Lin et al. | 135/25.1 |
| 6,035,873 A | * | 3/2000 | Lin et al. | 135/25.1 |

FOREIGN PATENT DOCUMENTS

| | | | | |
|---|---|---|---|---|
| CH | 260456 | * | 7/1949 | 135/25.4 |
| FR | 866260 | * | 7/1941 | 135/25.1 |

* cited by examiner

*Primary Examiner*—Harry C. Kim
(74) *Attorney, Agent, or Firm*—Troxell Law Office PLLC

(57) ABSTRACT

An improved central shaft for collapsible umbrella includes a plurality of telescopic tubes. Each pair of adjacent tubes are overlapped and engaged by a circular perimeter section and a flat indent plane, or a flat indent plane and an inside concave section formed at the ends of the tube. The overlapped engagement sections of the tube may be made at a selected length desired to obtain strong engagement strength. The tube number may be increased to five so that each tube may be shorter to make the umbrella compact and convenient to carry and use.

3 Claims, 11 Drawing Sheets c-c section a-a section d-d section b-b section e-e section c-c section a-a section d-d section b-b section

CENTRAL SHAFT FOR COLLAPSIBLE UMBRELLA

1. Field of the Invention

This invention relates to an improved central shaft for collapsible umbrella and particularly to a central shaft that has a novel form of telescopic tubes for increasing tube number and enhancing tube engagement strength.

2. Background of the Invention

Collapsible umbrella is a widely used personal outfit. Conventional collapsible umbrella usually has a central shaft consisting of a plurality of telescopic tubes. Each tube has an engagement means to prevent the tubes from separating from each other during the central shaft extension. U.S. Pat. No. 5,702,198 discloses a central shaft structure (shown in FIG. 1) in which an inner tube A has a concave side of different curvatures G and H, and an outer tube B also has a concave side of different curvatures G and H so that the inner tube A may be slided inside the outer tube B without swiveling or disengaging. In practice, the difference of curvatures G and H is not very huge (FIG. 3). The central shaft usually consists of four tubes or less, such as an inner tube C, a first middle tube D, a second middle tube E and an outer tube F (FIG. 2). The first and second middle tubes D and E have respectively at least two concave sides of different height for engagement. The engagement strength is not very strong. Pulling the tubes with a strong force can easily separating the tubes and make the central shaft not functional. There is still room for improvement.

SUMMARY OF THE INVENTION

It is an object of this invention to provide an improved central shaft for collapsible umbrella that has telescopic tubes formed with novel shapes of selected length or height such as a circular perimeter section mating against a flat indent plane, or a flat indent plane mating against an inside concave section so that tube to tube engagement force may be greatly enhanced and tube number may be increased up to five.

Total size of the umbrella may be further reduced to make the umbrella more compact and convenient and useful.

BRIEF DESCRIPTION OF THE DRAWINGS

The invention, as well as its many advantages, may be further understood by the following detailed description and drawings in-which.

DETAILED DESCRIPTION OF THE PREFERRED EMBODIMENT

Figure 1:
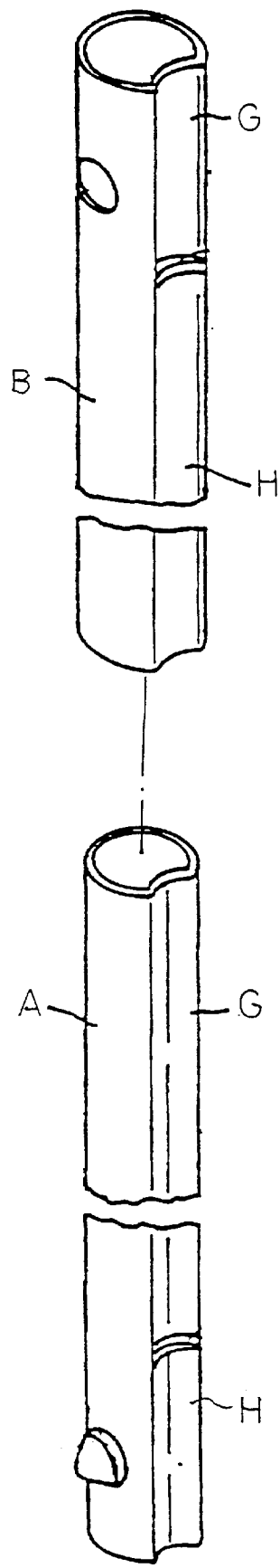
FIG. 1 is an exploded view of a conventional central shaft for a collapsible umbrella.
Figure 2:
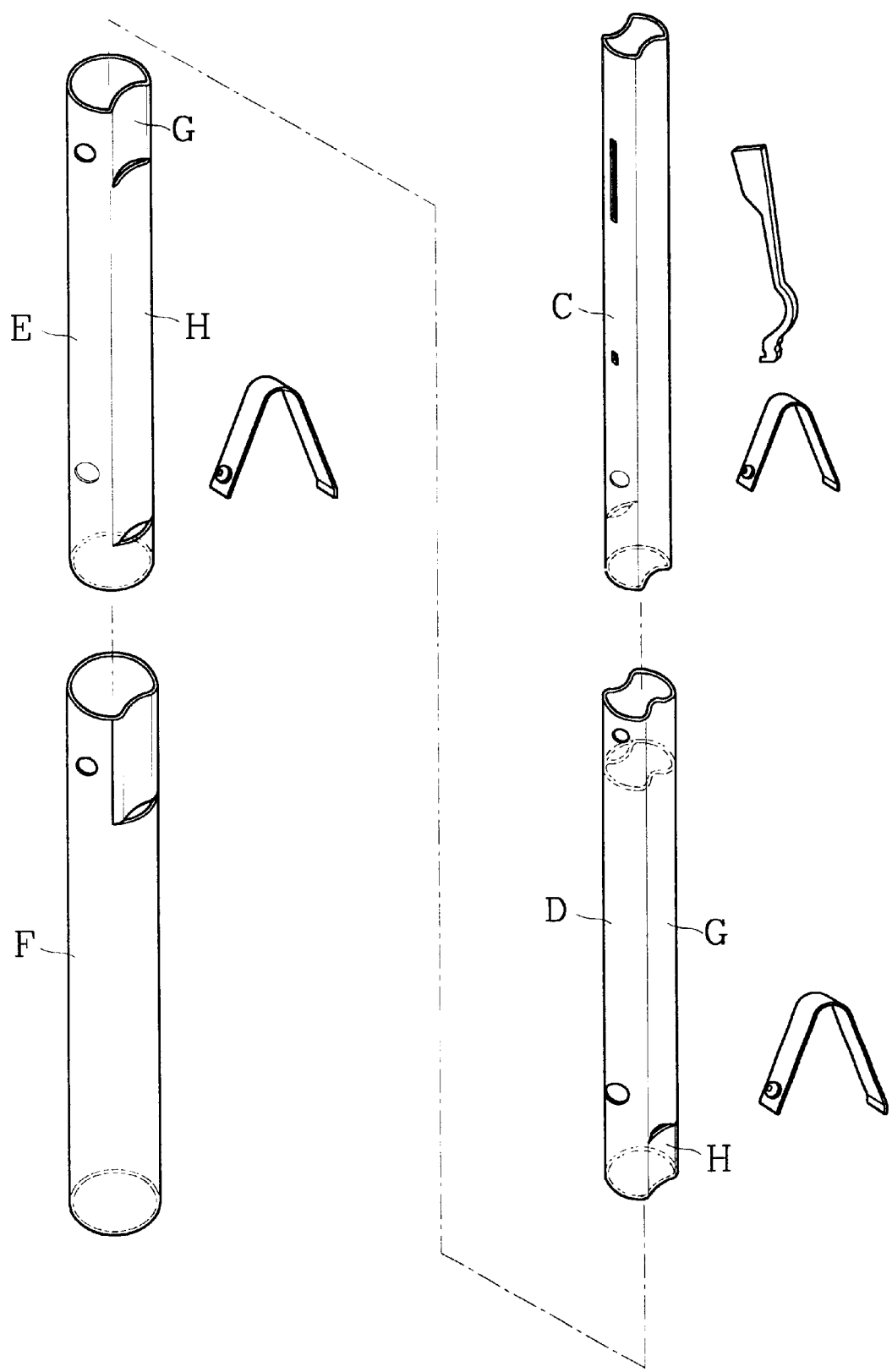
FIG. 2 is an exploded view of a conventional four-tube central shaft.
Figure 3:
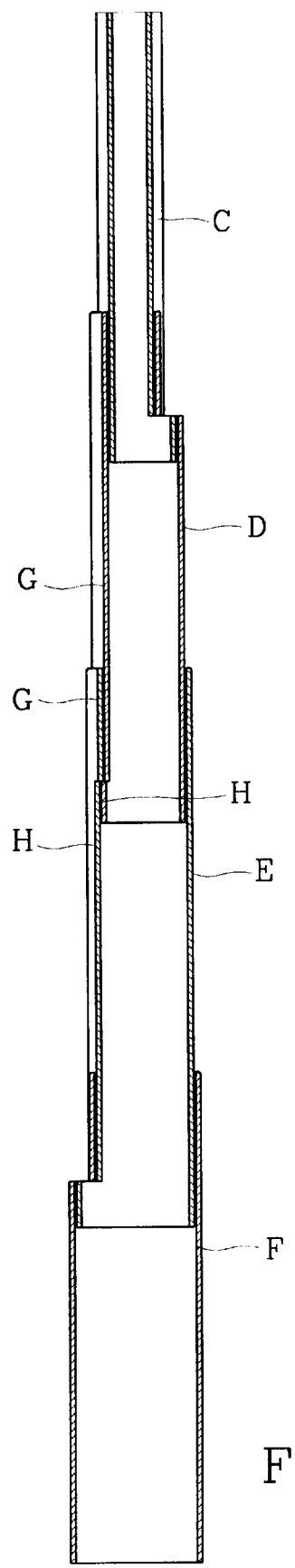
FIG. 3 is a sectional view of a conventional four-tube central shaft.
Figure 4:
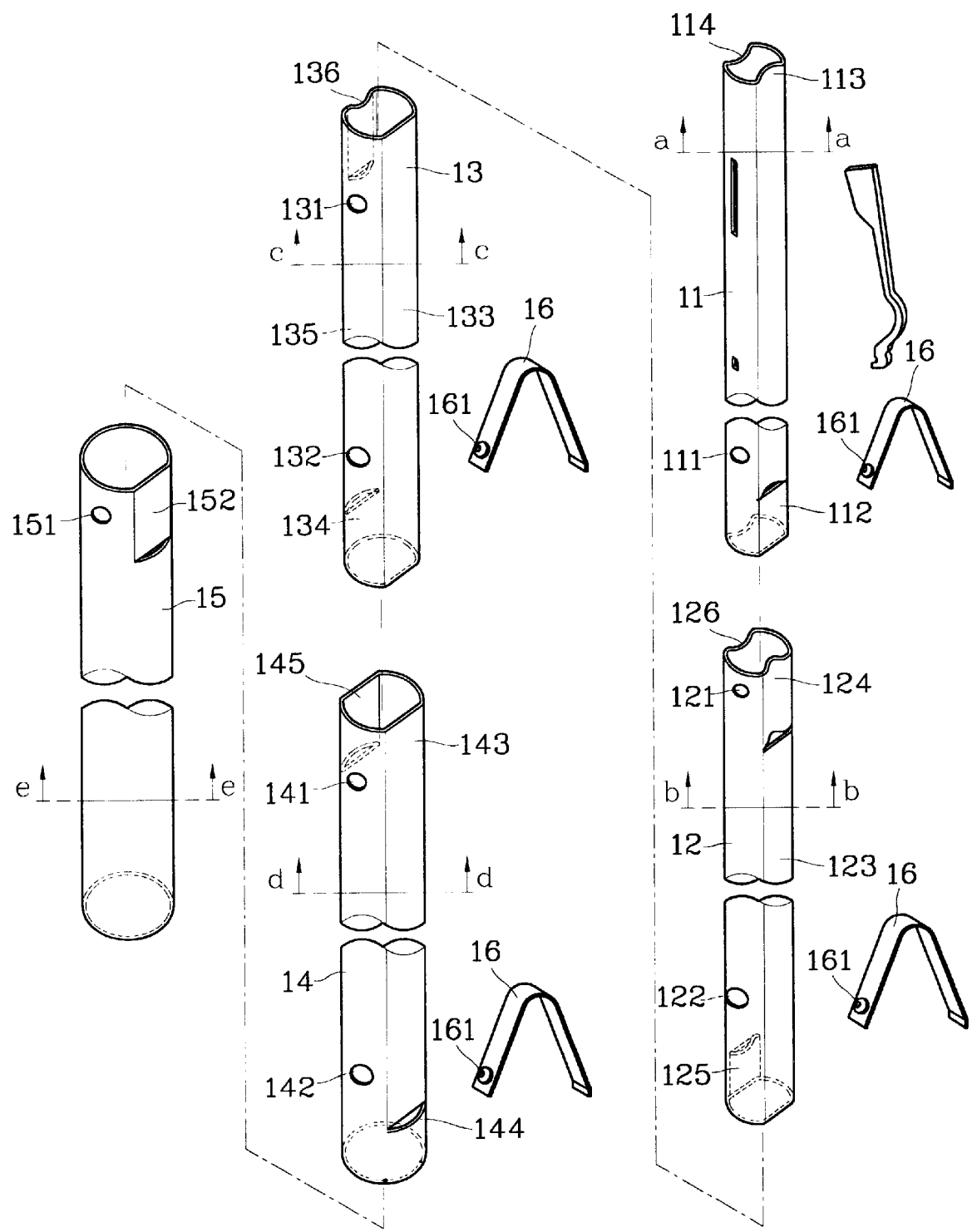
FIG. 4 is an exploded view of a five-tube central shaft of this invention.
Figure 4C:
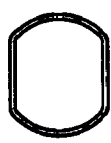
FIG. 4C is a cross sectional view taken on line c—c in FIG. 4.
Figure 4A:
FIG. 4A is a cross sectional view taken on line a—a in FIG. 4.
Figure 4D:
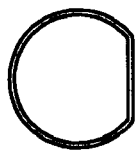
FIG. 4D is a cross sectional view taken on line d—d in FIG. 4.
Figure 4B:
FIG. 4B is a cross sectional view taken on line b—b in FIG. 4.
Figure 4E:
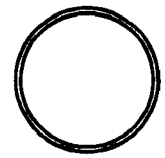
FIG. 4E is a cross sectional view taken on line e—e in FIG. 4.
Figure 5:
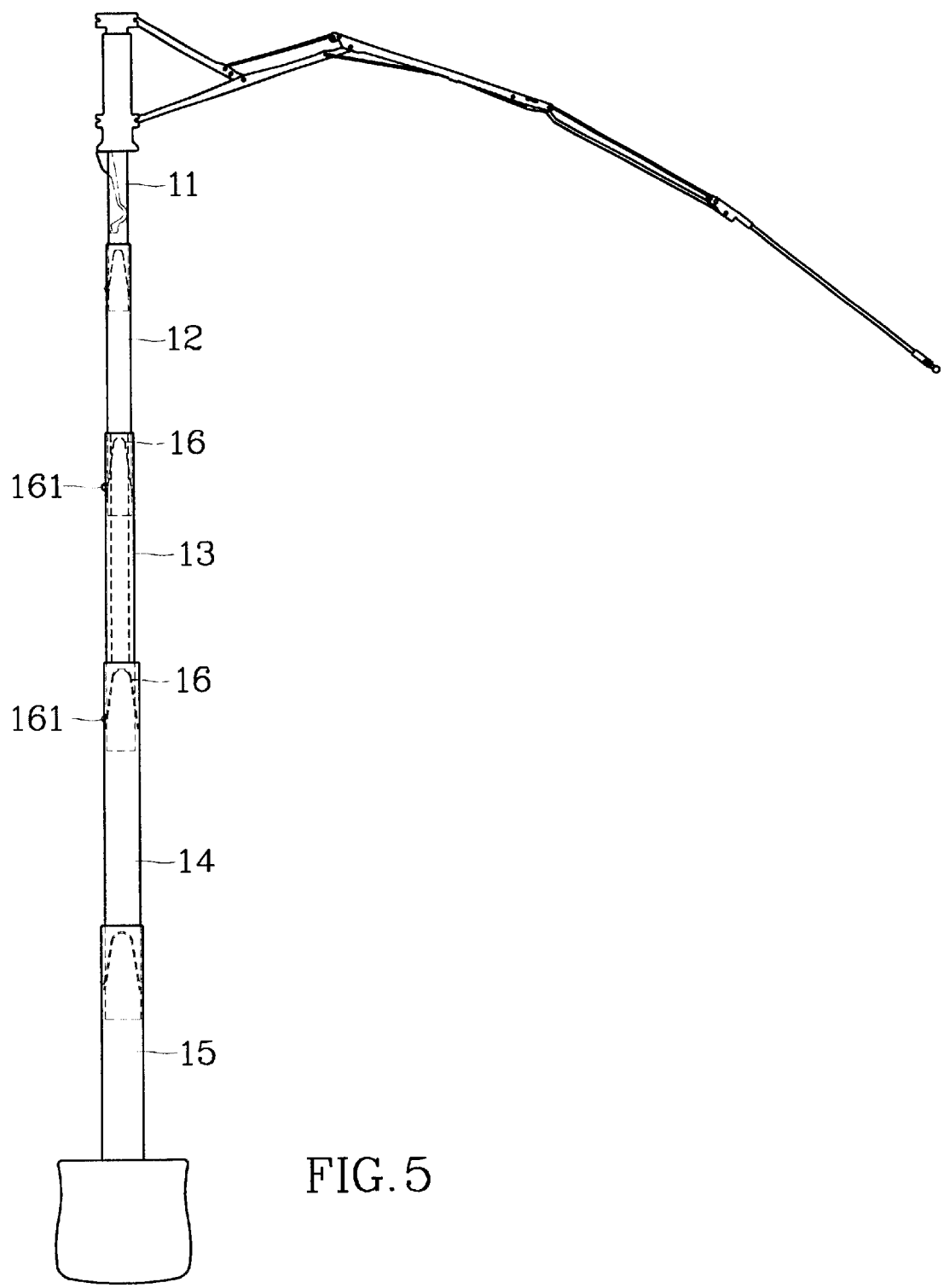
FIG. 5 is a side view of a five tube central shaft of this invention.

Referring to FIG. 4 and 5, the central shaft according to this invention includes a plurality of telecospic tubes. Each pair of adjacent tubes have a flat indent plane or inside concave section to engage with each other. The indent plane and inside concave section and tube perimeter section have selected height to limit the axial movement of the tube so that the shaft may be extended to a desirable length and still maintain firmly engaged. The number of the tube may be selected at a desirable number to make each tube short and thus making the whole umbrella become small size and convenient to carry and use. FIG. 4 and 5 show a five-tube central shaft structure. It includes an inner tube 11 which has a flat indent plane 112 formed at one side at a lower end, an aperture 111 formed at another side, two inside concave sections 113 and 114 and a strip spring 16 located inside the inner tube 11. The strip spring 16 has a bulge 161 at one end thereof engageable with the aperture 111. The concave wall 113 is extended from the flat indent plane 112 at one side while the concave wall 114 is formed end to end on the tube 11 in the opposite side. There is a first middle tube 12 for housing the inner tube 11 that has two flat indent planes 123 and 125 formed at two opposite side walls at different height. The rest of the side walls are respectively formed with an inside concave sections 124 and 126 of different height. There is also a strip spring 16 inside with a bulge 161 at one end thereof engageable with an aperture 122 formed at one end of the first middle tube 12.

There is a second middle tube 13 for housing the first middle tube 12. It has a flat indent plane 133 at one side. At the opposite side, the side wall forms a circular perimeter section 134 at a lower end, a flat indent plane 135 and an inside concave section 136 at an upper end thereof. It also has a strip spring 16 inside with a bulge 161 at one end thereof engageable with an aperture 132 formed in a side wall at one end of the second middle tube 13.

There is a third middle tube 14 for housing the second middle tube 13. It has a circular perimeter section 144 at one side at a lower end and a flat indent plane 143 bordering the circular perimeter section 144. At the opposite side, the circular perimeter section is extended to a selected height then form an flat indent section 145 at an upper end. It also has a strip spring 16 inside with a bulge 161 at one end engageable with an aperture 142 formed at one end thereof.

The outer tube 15 is circular and has an flat indent plane 152 for a selected length at an upper end. There is an aperture 151 formed at the upper end. All the middle tubes (i.e. 12,13, and 14) have respectively a second aperture 121,131 and 141 formed at another end thereof. The second aperture 121, 131 and 141 are respectively mating against the aperture of adjacent tube, i.e. 111, 122 and 132 when the central shaft is fully extended.

When the central shaft is at a collapsed state, the inner tube 11 and middle tubes 12, 13 and 14 are telescopically housed in the outer tube 15. The bulge 161 of each tube extends into the aperture 111 (or 122, 132, 142) and makes contact with the other adjacent tube so that inside tubes may be securely held in the outer tube 15 because of spring force (from the strip spring 16). When in use, the inner tube 11 may be pulled outward to overcome the strip spring force until the bulge 161 engages with the second aperture 121 of the first middle tube 12. The flat indent plane 112 will be stopped by the inside concave section 124 to form a first stage extension (also shown in FIG. 6).

When continuously applying the pulling force, the first middle tube 12 will be pulled out from the second middle tube 13 until the bulge 161 (of the first middle tube 12) engages with the aperture 131 of the second middle tube 13 and the flat indent plane 125 stopped by the inside concave section 136. This forms a second stage extension (also shown in FIG. 6).

By the same taken, upon continuously applying the pulling force, the second middle tube 13 will be pulled out from the third middle tube 14 until the bulge 161 (in the second middle tube 13) engages with the aperture 141 of the third middle tube 14 and the circular perimeter section 134 stopped by the flat indent plane 145. This forms a third extension stage (also shown in FIG. 6).

Figure 6:
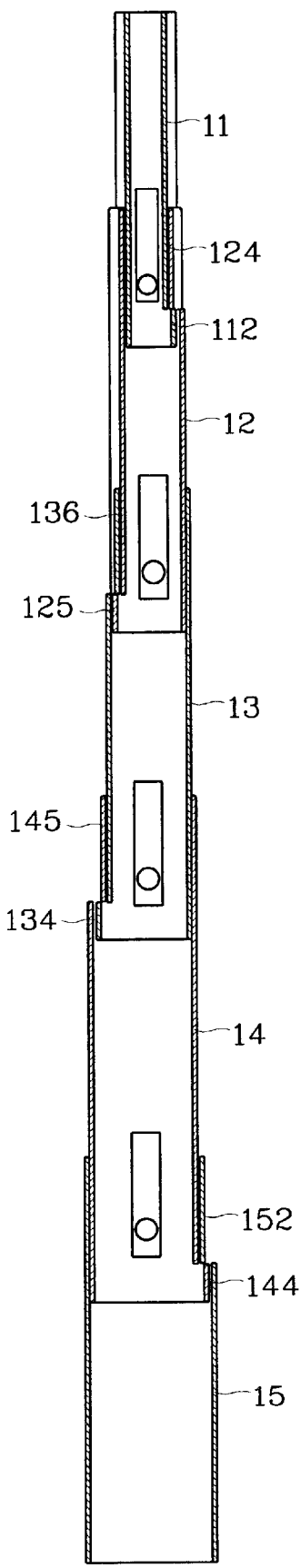
FIG. 6 is a sectional view of a five-tube central shaft of this invention.

By the same taken again, the continuously applying pulling force will pull the third middle tube 14 from the outer tube 15 until the bulge 161 (of the third middle tube 14) engages with the aperture 151 of the outer tube 15 and the circular perimeter section 144 stopped by the flat indent plane 152 (shown in FIG. 6). It then becomes a fully extended central shaft and umbrella (shown in FIG. 5). The strip spring 16 and the bulge 161 will keep the extended tubes from withdrawing unless an external force is applied for folding the umbrella. As the overlap sections between the tubes is determined by the length and height of the flat indent plane and inside concave section and perimeter section, proper selection of the length and height and tube thickness may make the engagement between the tubes become as strong as desired. The five-tube structure of this invention makes each tube shorter than conventional three or four-tube structure. The final umbrella assembly thus may become more compact and convenient to carry and use.

Figure 7:
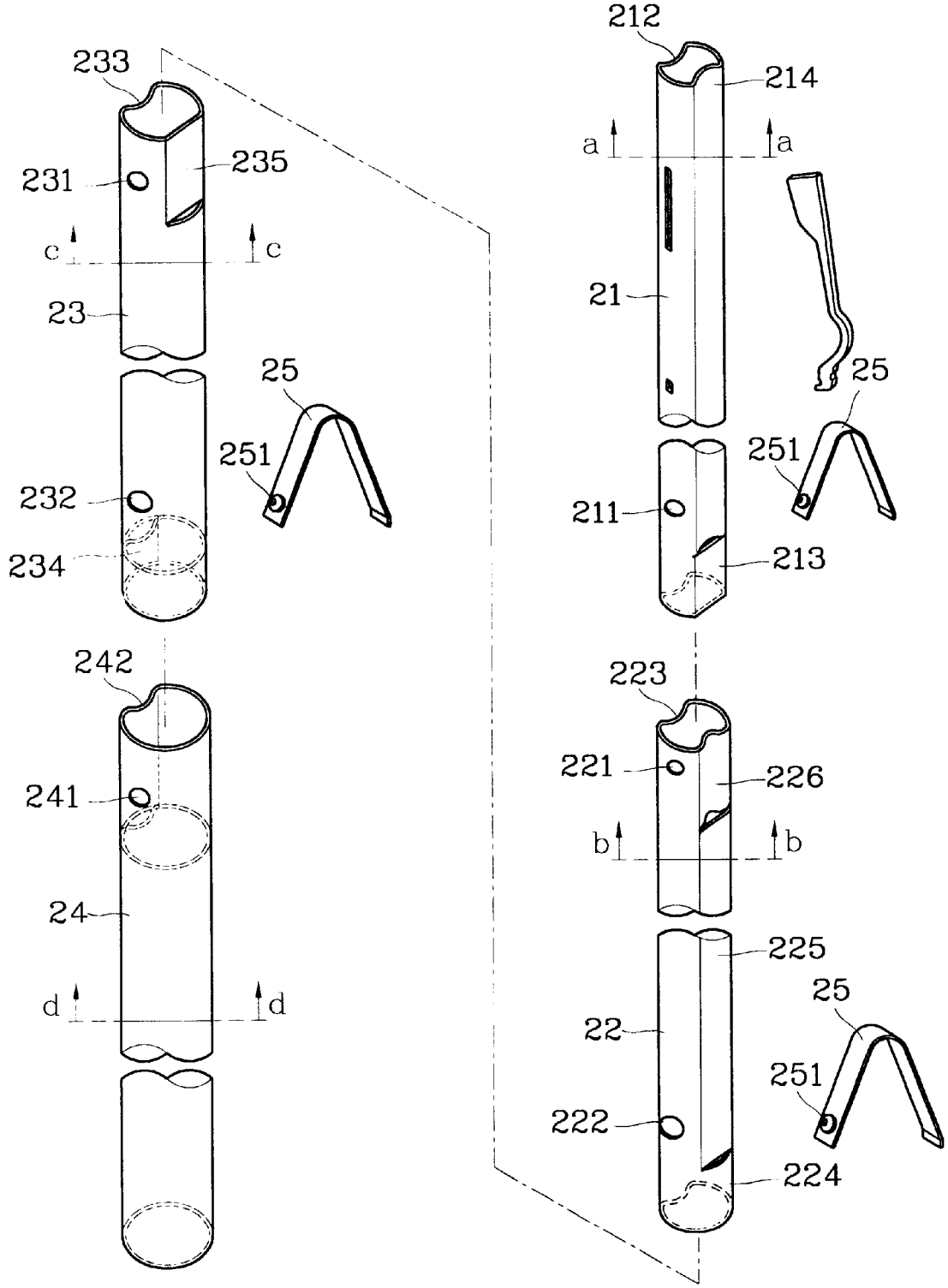
FIG. 7 is an exploded view of a four-tube central shaft of this invention.
Figure 7C:
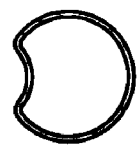
FIG. 7C is a cross sectional view taken on line c—c in FIG. 7.
Figure 7A:
FIG. 7A is a cross sectional view taken on line a—a in FIG. 7.
Figure 7D:
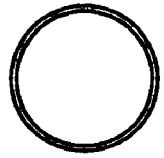
FIG. 7D is a cross sectional view taken on line d—d in FIG. 7.
Figure 7B:
FIG. 7B is a cross sectional view taken on line b—b in FIG. 7.
Figure 8:
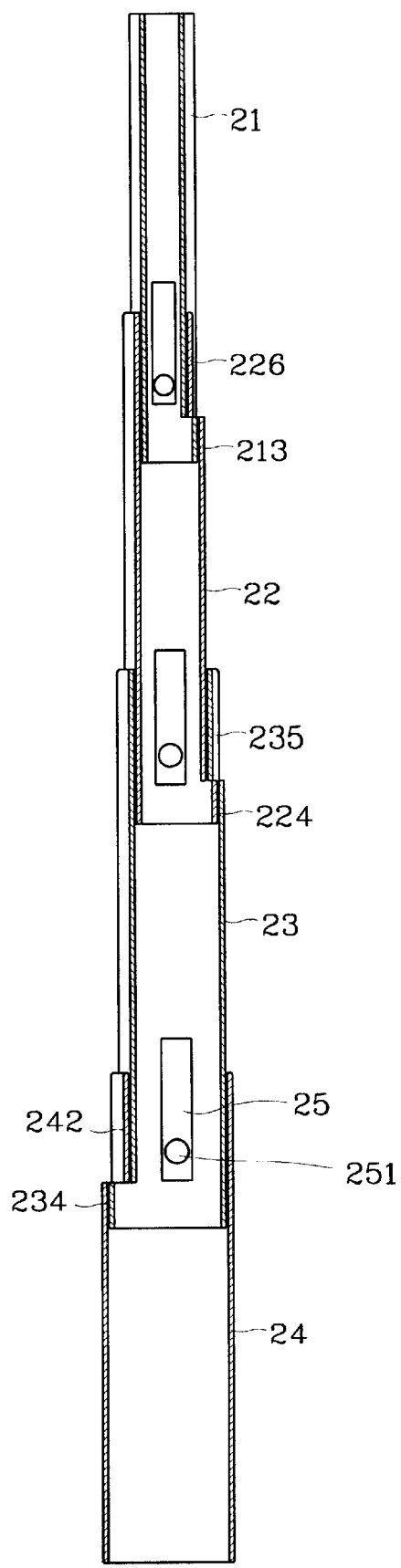
FIG. 8 is a sectional view of a four-tube central shaft of this invention.
Figure 9:
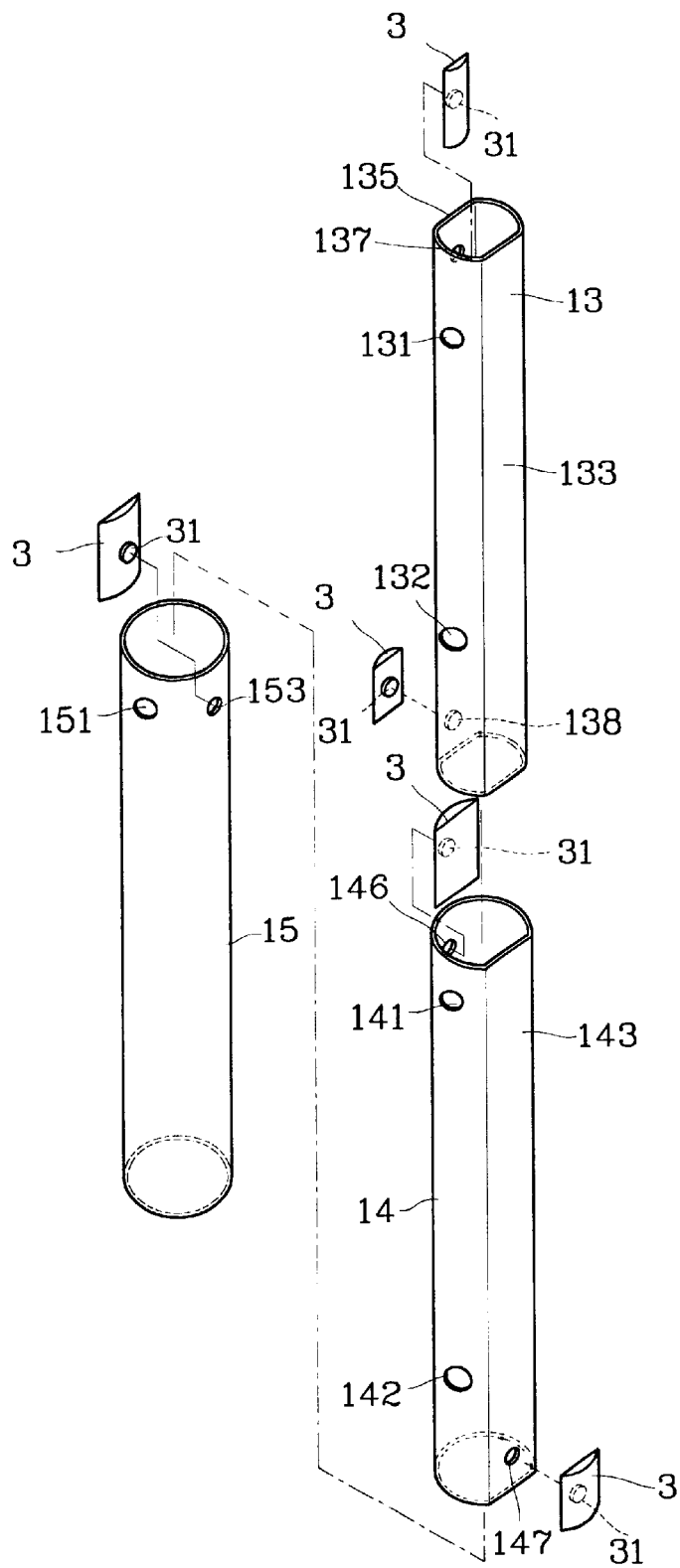
FIG. 9 is a pictorial view of a tube stopper for this invention.

FIG. 7 and 8 show another embodiment of this invention for a four-tube collapsible umbrella. It is largely constructed like the one shown in FIG. 4 and 5. The following highlights the main differences between the two. The inner tube and first middle tube are substantially same except the numerals marked for the component. The first digit is "2" to replace "1". The strip spring is marked by 25 with a bulge marked by 251. Moreover the first middle tube 22 has a circular perimeter section 224 at a lower end to replace the flat indent plane 225. The second middle tube 23 is also largely like the tube 13. However the flat indent plane 235 is a shorter section located at a top end of one side with the rest of the tube of same side forming a circular perimeter section, and the opposite side has a small circular peripremeter section 234 at a low end and an inside concave section 233. The outer tube 24 has circular perimeter except the top section which has an inside concave section 242. The operation principle is essentially same as the five-tube embodiment shown in FIG. 4 depicted above. FIG. 9 shows another embodiment of this FIG. 4. However instead of forming inside concave sections on the tubes that may complicate production process and increase cost, the tube 15 is formed by a simple circular tube, the third middle tube 14 has one straight flat indent plane 143 formed on a circular tube and the second middle tube 13 has two opposite straight flat indent planes 133 and 135 formed on a circular tube. At both ends of the middle tubes 13 and 14, there are provided respectively with a stopper 3. Each stopper 3 has a flat surface at one side and a curved surface at an opposite side and a stub 31 engageable with an aperture 137, 138,146 and 147 formed at two ends of the middle tubes 13 and 14. The outer tube 15 also has a stopper 3 fixed to an aperture 153 location at one end thereof. The length of the stopper 3 and the location of the apertures 137,138,146,147 and 153 determine the overlap section between the tubes. Such a structure makes production of the tube simpler and cheaper.

In summary, this invention offers a simple structure that can greatly enhance tube engagement strength and making the central shaft of the collapsible umbrella stronger. The number of tube may be increased to shorten tube length and makes the umbrella compact and easy to carry and use.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An improved central shaft for a collapsible umbrella wherein the central shaft includes a plurality of telescoping tubes and comprising: an inner tube, a first middle tube, a second middle tube, a third middle tube and an outer tube; the outer tube having a first flat indent plane at a top portion thereof; the third middle tube is slidable in the outer tube and has a second flat indent plane on a first side mating against the first flat indent plane, a first circular perimeter section at one end below the second flat indent plane, and a third flat indent plane at an upper portion on a second, opposite side thereof and a second circular perimeter section below the third flat indent plane; the second middle tube is slidable in the third middle tube and has a fourth flat indent plane at a first side thereof mating against the second flat indent plane, a third circular perimeter section at a lower portion of a second, opposite side thereof, and a first concave section at an upper portion on the second side thereof; the first middle tube is slidable in the second middle tube and has a fifth flat indent plane and a second inside concave section at an upper portion on a first side thereof, a sixth flat indent plane at a lower portion on a second, opposite side thereof, and a third inside concave section at the second side above the sixth flat indent plane; the inner tube is slidable in the first middle tube and has a seventh flat indent plane on a first side thereof; a lower portion mating against the fifth flat indent plane, a fourth inside concave section above the seventh flat indent plane, and a fifth inside concave section on a second, opposite side thereof, whereby the circular perimeter, the flat indent planes and the inside concave section latch and confine adjacent telescoping tubes to prevent the disengagement of the telescoping tubes.

2. The improved central shaft of claim 1, wherein the inner tube has an aperture formed in a side wall at a lower end, the outer tube has an aperture formed in a side wall at a lower end, the outer tube has an aperture formed in a side wall at an upper end, the first middle tube, second middle tube and third middle tube each have, respectively, an aperture formed at a side wall at two ends thereof mating against the aperture of an adjacent middle tube at a different end, the inner tube, first middle tube, second middle tube and third middle tube each have, respectively, a strip spring located therein, each strip spring having a bulge at one end thereof engageable with the aperture located at a lower end thereof.

3. An improved central shaft for a collapsible umbrella wherein the central shaft includes a plurality of telescoping tubes and comprising: an inner tube, a first middle tube, a second middle tube and an outer tube; the inner tube has an aperture formed in a side wall at a lower end, the outer tube has an aperture formed in a side wall at an upper end, the first and second middle tubes each have respectively an aperture formed in a side wall at upper and lower ends thereof; the inner tube, the first and the second middle tubes each have, respectively, a strip spring located therein, each strip spring having a bulge at one end thereof engageable with one of the aperture located at the lower end of an adjacent tube; the outer tube has a first inside concave section at an upper end of one side; the second middle tube is slidable in the outer tube and has a first circular perimeter section at the lower end, a second inside concave section at a first side thereof above the first circular perimeter section mating against the first inside concave section, and a first flat indent plane at a second, opposite side at an upper end thereof; the first middle tube is slidable in the second middle tube and has a third inside concave section at a first side thereof, a fourth inside concave section at an upper portion, a second circular perimeter section at a lower end of a second, opposite side and a second flat indent plane at the second side between the fourth inside concave section and the second circular perimeter section; the inner tube is slidable in the first middle tube and has a fifth inside concave section at a first side thereof, a third flat indent plane at a lower portion of a second, opposite side thereof, and a sixth inside concave section at the second side above the third flat indent plane, whereby the circular perimeter, the flat indent planes and the inside concave section latch and confine adjacent telescoping tubes to prevent the disengagement of the telescoping tubes.

* * * * *